US010808877B2

(12) United States Patent
Reichel et al.

(10) Patent No.: US 10,808,877 B2
(45) Date of Patent: Oct. 20, 2020

(54) LINING HOSE FOR RENOVATING FLUID-BEARING PIPE SYSTEMS

(71) Applicant: SML Verwaltungs GmbH, Rohrbach (DE)

(72) Inventors: Stefan Reichel, Bad Duerkheim (DE); Christian Noll, Limburgerhof (DE)

(73) Assignee: SML Verwaltungs GmbH, Rohrbach (DE)

( * ) Notice: Subject to any disclaimer, the term of this patent is extended or adjusted under 35 U.S.C. 154(b) by 85 days.

(21) Appl. No.: 15/329,506

(22) PCT Filed: Jul. 29, 2015

(86) PCT No.: PCT/EP2015/067447
§ 371 (c)(1),
(2) Date: May 4, 2017

(87) PCT Pub. No.: WO2016/016347
PCT Pub. Date: Feb. 4, 2016

(65) Prior Publication Data
US 2017/0227159 A1 Aug. 10, 2017

(30) Foreign Application Priority Data
Jul. 31, 2014 (DE) .......................... 10 2014 110 929

(51) Int. Cl.
F16L 55/18 (2006.01)
F16L 55/165 (2006.01)
B32B 1/08 (2006.01)
B32B 5/26 (2006.01)
B32B 27/34 (2006.01)
B32B 27/06 (2006.01)
B32B 27/32 (2006.01)
B32B 5/22 (2006.01)
B32B 27/08 (2006.01)
B32B 7/12 (2006.01)
B32B 5/02 (2006.01)
B32B 27/12 (2006.01)
B32B 25/04 (2006.01)
B32B 27/30 (2006.01)
F16L 9/14 (2006.01)
F16L 11/04 (2006.01)
F16L 11/12 (2006.01)

(52) U.S. Cl.
CPC ............ *F16L 55/1656* (2013.01); *B32B 1/08* (2013.01); *B32B 5/02* (2013.01); *B32B 5/22* (2013.01); *B32B 5/26* (2013.01); *B32B 7/12* (2013.01); *B32B 25/04* (2013.01); *B32B 27/06* (2013.01); *B32B 27/08* (2013.01); *B32B 27/12* (2013.01); *B32B 27/302* (2013.01); *B32B 27/32* (2013.01); *B32B 27/34* (2013.01); *F16L 9/14* (2013.01); *F16L 11/04* (2013.01); *F16L 11/12* (2013.01); *B32B 2260/021* (2013.01); *B32B 2260/046* (2013.01); *B32B 2262/02* (2013.01); *B32B 2262/0253* (2013.01); *B32B 2262/0261* (2013.01); *B32B 2262/0269* (2013.01); *B32B 2262/0276* (2013.01); *B32B 2262/101* (2013.01); *B32B 2262/106* (2013.01); *B32B 2307/51* (2013.01); *B32B 2307/7242* (2013.01); *B32B 2307/7265* (2013.01); *B32B 2597/00* (2013.01); *F16L 55/1651* (2013.01); *F16L 55/1652* (2013.01)

(58) Field of Classification Search
CPC .................................................... F16L 55/1656
USPC ................ 138/97, 98; 405/150.1, 184.2
See application file for complete search history.

(56) References Cited

U.S. PATENT DOCUMENTS

| 4,714,095 | A | * | 12/1987 | Muller | ................ | F16L 55/1656 |
| | | | | | | 138/105 |
| 5,180,458 | A | * | 1/1993 | White | ..................... | B29C 49/26 |
| | | | | | | 156/287 |
| 5,186,987 | A | * | 2/1993 | Imoto | ....................... | B32B 5/26 |
| | | | | | | 428/34.5 |
| 5,205,886 | A | * | 4/1993 | White | ..................... | B29C 63/34 |
| | | | | | | 138/145 |
| 5,271,433 | A | * | 12/1993 | Schwert | ............. | F16L 55/1656 |
| | | | | | | 138/124 |
| 5,322,653 | A | * | 6/1994 | Muller | .................... | B29C 63/28 |
| | | | | | | 138/97 |
| 5,411,060 | A | * | 5/1995 | Chandler | ................ | B29C 63/34 |
| | | | | | | 138/103 |
| 5,501,248 | A | * | 3/1996 | Kiest, Jr. | .................. | D04B 1/02 |
| | | | | | | 138/123 |
| 5,798,013 | A | | 8/1998 | Brandenburger | | |
| 6,068,725 | A | * | 5/2000 | Tweedie | ................ | F16L 55/179 |
| | | | | | | 138/97 |

(Continued)

FOREIGN PATENT DOCUMENTS

| DE | 10 2007 042546 | 3/2009 |
| DE | 10 2011 105 592 | 12/2012 |
| DE | 10 2011 105 995 | 1/2013 |
| EP | 0510306 | 10/1992 |
| JP | 2013-223939 A | 10/2013 |
| WO | WO 95/04646 | 2/1995 |
| WO | WO 00/073692 | 12/2000 |

OTHER PUBLICATIONS

Reichel et al, "Lining Hose for Renovating Fluid-Bearing Pipe Systems", U.S. Appl. No. 15/329,509, filed Jan. 26, 2017.
International Search Report and Written Opinion received in connection with international application No. PCT/EP2015/067447; dated Oct. 29, 2015—with English translation.

Primary Examiner — James F Hook
(74) Attorney, Agent, or Firm — The Marbury Law Group, PLLC

(57) ABSTRACT

The present invention relates to the use of a lining hose with at least one seamless tubular inner foil and at least one curable layer comprising at least one fiber ribbon impregnated with a curable resin for the renovation of pressurized fluid carrying pipe systems.

13 Claims, No Drawings

(56) References Cited

U.S. PATENT DOCUMENTS

| | | | |
|---|---|---|---|
| 6,196,271 B1 * | 3/2001 | Braun | F16L 55/1654 138/97 |
| 6,360,780 B1 * | 3/2002 | Adolphs | F16L 55/1656 138/130 |
| 6,582,655 B2 * | 6/2003 | Botsolas | F16L 35/00 134/2 |
| 6,679,966 B1 | 1/2004 | Brandenburger | |
| 8,567,450 B2 * | 10/2013 | Sringfellow | B29C 63/343 138/104 |
| 8,580,364 B2 * | 11/2013 | Quitter | B32B 5/04 138/98 |
| 2002/0124898 A1 * | 9/2002 | Renaud | F16L 55/1651 138/98 |
| 2003/0113489 A1 * | 6/2003 | Smith | B32B 27/04 428/34.5 |
| 2005/0028881 A1 * | 2/2005 | Smith | F16L 55/1651 138/98 |
| 2005/0161100 A1 * | 7/2005 | Pleydon | B32B 7/12 138/98 |
| 2008/0277013 A1 * | 11/2008 | Anders | F16L 55/1651 138/98 |
| 2011/0030830 A1 * | 2/2011 | McKaigue | F16L 41/10 138/98 |
| 2011/0135899 A1 * | 6/2011 | Meltzer | B32B 27/12 428/217 |
| 2012/0147920 A1 | 6/2012 | Glombitza | |
| 2012/0291903 A1 * | 11/2012 | Ekelund | B29C 53/805 138/97 |
| 2014/0034175 A1 * | 2/2014 | Fyfe | F16L 55/165 138/97 |
| 2015/0034199 A1 * | 2/2015 | Klinger | C08J 3/241 138/97 |

* cited by examiner

LINING HOSE FOR RENOVATING FLUID-BEARING PIPE SYSTEMS

The present invention relates to a liner tube (hereinafter referred to as lining hose) for the renovation of pressurized fluid bearing pipe systems.

Processes for the rehabilitation (renovation) of pipe (conduit) systems, in which e.g. liquid or gaseous media are transported are known in the state of the art and have been described repeatedly.

As an example, processes may be mentioned wherein segments of the pipe systems which comprise defects or which are damaged are replaced by new pipe segments. However, this is laborious and not always possible.

Furthermore, processes are known in the state of the art in which, for the rehabilitation of sewer lines or similar conduit systems, a flexible fiber hose impregnated with a hardenable (curable) resin, which serves as lining hose (also referred to as liner), is introduced into the conduit system. After introduction of the lining hose, same is expanded to fit snugly or adapt to the inner wall of the conduit system. Thereafter the resin is cured (hardened).

The manufacture of such a lining hose is described e.g. in WO 95/04646. Such lining hose usually comprises an outer protective foil impervious (opaque) to light, an inner foil being transparent for at least light of certain wavelength ranges and a fiber ribbon impregnated with resin, which is arranged between said inner foil and said outer foil.

The outer tubular foil is intended to prevent leakage of the resin used for impregnation out of the fiber ribbon into the environment. This requires a good leak tightness of the outer tubular foil and a good adhesion of the outer tubular foil to the resin-impregnated fiber hose.

From WO 00/073692 (DE A 199 24 251) a lining hose is known, which comprises an inner tubular foil, a fiber ribbon impregnated with resin and an outer tubular foil, which is laminated (lined) on its inner surface (i.e. the surface oriented towards the resin-impregnated fiber ribbon) to a fiber non-woven.

In many cases, in the course of manufacturing a lining hose, the resin impregnated tubular fiber foil (fiber hose) is coiled (wound) onto (around) the inner tubular foil in the form of a helix (spiral) in an overlapping manner. The outer tubular foil thereafter is also coiled (wound) in the form of a helix (spiral) in an overlapping manner around the resin-impregnated fiber hose.

The inner tubular hose (foil) is wound (coiled) itself around a mandrel to facilitate the manufacture. As an alternative e.g. WO 95/04646 discloses that a preformed inner tubular hose (foil) may be blown-up (expanded) and may serve itself as a mandrel. Such a pre-formed inner tubular hose is obtained from a flat foil, the rims of which are connected with each other by welding or gluing to form the inner tubular hose.

However, for the use of lining hoses in fluid-bearing (fluid-carrying) pipe (conduit) systems is it disadvantageous to use inner tubular hoses which are wound (wrapped) or manufactured according to the state of the art by welding or gluing of a flat foil.

In the known inner tubular hoses the joint and connection areas respectively during winding the overlapping areas of the flat foil constitute a weak area which in many cases can only be sealed by additional sealing elements. In addition, the fact that at the joint area or welding line an increased nucleation can occur thereby increasing the flow resistance has been found to be disadvantageous.

In the systems mentioned above and described in the prior art, the inner tubular hose is removed, i.e. pulled-out after installation of the lining hose into the pipe (conduit) system. This requires that a bonding or connection of the inner tubular hose with the resin-impregnated fiber ribbons during curing does not occur because otherwise the pulling-out or removal of the inner tubular hose can lead to damages of the inner surface of the cured lining hoses if the foil hose is adhering to the resin-impregnated layers. This can lead to leakages and instabilities of the cured lining hose.

In thermally curing systems inner tubular hoses with fiber lamination have been used; in those cases the inner tubular hoses were obtained by overlapping folding of the longitudinal rims of a flat foil (foil belt) or by winding of a fiber-laminated longitudinal foil. In photochemically curing systems this has the disadvantage, however, that the transparency of the inner tubular foil for the radiation used during curing is detrimentally influenced which can lead to problems during curing. Furthermore, the lamination of the flat foil cannot be made over the entire surface of the foil because the lamination prevents or severely hampers the gluing of the rims of the foil, if said rims are covered with a laminate. As a result, a laminated tubular foil (foil hose) is obtained which comprises areas not laminated, which may lead to inhomogenities and a number of problems associated therewith.

DE 10 2011 105 995 lining hoses for the renovation of fluid-bearing (fluid-carrying) systems are known which comprise a) at least one inner tubular foil based on a thermoplastic polymer, b) at least one outer tubular foil on the basis of a thermoplastic polymer, and c) at least one fiber hose impregnated with a photochemically curing resin arranged between at least one inner and and at least one outer tubular foil, wherein at least one inner tubular foil, which is in contact with at least one fiber hose impregnated with a photochemically curable resin, comprises functional groups on the surface which, in the installed status, is oriented towards the fiber hose, which functional groups undergo a reaction with the fiber belt. The inner tubular foils are obtained through winding or by overlaying the longitudinal rims of flat foils.

It was therefore an object of the present invention to overcome the disadvantages of the prior art and to provide a lining hose for the renovation of pressurized fluid-bearing (fluid-carrying) pipe systems which makes possible a good leak tightness, a reduced nucleation and an improved flow resistance.

This object is achieved in accordance with the present invention with the use at least one seamless inner tubular foil in a lining hose comprising at least one curable layer of a fiber ribbon impregnated with a curable resin and positioned directly or indirectly on the tubular inner foil for the renovation of pressurized pipe systems for the transport of fluid media. The seamless inner tubular foil is thus in direct or indirect contact with the curable layer.

The use of the inner foil in accordance with the present invention for the renovation of pressurized pipes for water or wastewater or for the renovation of pressurized pipe systems in industrial production facilities is preferred.

Indirect contact, for the purpose of the present invention, shall mean that contact may also be achieved through intermediary further elements which on one hand bind the inner tubular foil and which on the other hand are bound themselves to the resin impregnated fiber belt respectively fiber belts.

By using a seamless inner foil respectively a seamless inner tubular foil a good leak tightness and a reduced nucleation due to the lack of seam areas is achieved. Furthermore, the flow resistance in the interior of the lining hose is reduced.

After curing of the lining hoses in the pipe (conduit) system same should be as leak-tight as possible. In the course of a tightness test in accordance with DIN EN 1610 (1997), Chapter 13.2, procedure L (test with air) in a lining tube in accordance with the prior art a maximum pressure drop (pressure loss) of 15 mbar (150 Pa) during a measurement time period of 1.5 to 5 min (depending on diameter and thickness) and a pressure of 200 mbar (2000 Pa) is permitted. Such a pressure loss corresponds to a leak tightness which is sufficient for most of the application areas.

The term fluid bearing (fluid carrying) pressurized pipe (conduit) system for the purpose of the present invention is intended to denote pipe systems of any kind for the transport of fluid or gaseous media which are operated at a pressure above atmospheric pressure. Just by way of example pipelines of any kind, tubular pipe systems for the transport of media in chemical production sites and facilities, water pipes and drinking water pipes and in particular sewer pipes, which are installed underground or non-visible. The pipe systems may be operated at atmospheric pressure (so called gravity or free-flow lines or sewers) or may be pressurized with a pressure above atmospheric pressure.

Principally any polymeric material from which foils can be obtained are suitable for the manufacture of the seamless inner tubular foil in accordance with the present invention. If photochemically curable resins are used in the fiber belts the inner tubular foil should have a sufficient transparency (permeability) for the radiation used for curing.

A first exemplary group of preferred polymers are homopolymers or copolymers of olefins, in particular of α-olefins with preferably 2 to 8 carbon atoms, in particular 2 to 6 carbon atoms. Particular preferred monomers are ethene (ethylene), propene (propylene) and octene, whereby the latter is easily copolymerizable with ethene (ethylene).

As comonomers for the olefins mentioned before in particular alkyl acrylates or alkyl methacrylates derived from alcohols with 1 to 8 carbon atoms, e.g. ethanol, butanol or ethyl hexanol, to mention only some preferred examples, are suitable.

In some cases so called functionalized EPDM-rubbers have shown to be advantageous, which, due to their elastic properties, have advantages during expanding the lining hose to fit snugly with the pipe system to be renovated.

Suitable polymers furthermore are polymers based on vinylaromatic monomers and dienes, e.g. styrene and dienes, wherein the dienes may be partly or fully hydrogenated, and which polymers comprise respective functional groups. Such copolymers may be random or block-copolymers and may comprise mixed forms (so called tapered structures). Respective products have been described in the literature and are commercially available from various suppliers. As examples the commercial product lines Styrolux® and Styroflex® of BASF SE may be mentioned.

It has been shown that multi-layer composite foils have advantages in terms of rigidity (stability) and therefore such foils are generally preferred.

In accordance with a preferred embodiment of the invention, the inner tubular foil is a multi-layer composite foil on the basis of olefin homo- or copolymers or a multi-layer composite foil based on said polymers and polyamides and/or the inner foil has a thickness in the range of from 100 to 1000 µm, preferably of from 100 to 500 µm, particularly preferred in the range of from 100 to 300 µm.

In accordance with a further embodiment of the present invention the inner tubular foil comprises a barrier layer. The term barrier layer, as used herein, is intended to denote a layer which reduces or prevents the permeation of components of the resin used for impregnation of the fiber ribbons or the permeation of the resin itself or the permeation of solvents used for the resin. A leakage of these resin components or the resin itself through the inner surface of the inner tubular foil into the space where the medium to be transported is flowing is generally undesired—in the case of drinking water lines e.g. very low maximum allowances are defined which have to be fulfilled (met).

Accordingly, in embodiments of the present invention, at least one of the layers of a multi-layer composite foil preferably used as inner tubular foil or of a single-layered foil comprises a barrier layer which reduces or prevents the diffusion of styrene (styrene is frequently used as a solvent or reactive diluent in the resins used for impregnation of the fiber ribbons). Suitable foil materials are known to the skilled person and have been described in the literature.

The barrier effect of a foil towards a specific substance depends directly on the diffusion coefficient of the respective substance, the thickness of the foil and the pressure difference between both sides of the foil. A sufficient barrier effect is achieved if, within a period of 24 hours, the amount of the compound in question permeating through the foil does not exceed a pre-set upper value. Respective upper limit values for permeation or diffusion depend inter alia on whether the pipe system to be renovated is a system for the transport of food or drinking water where very low maximum values have to be obeyed. The skilled person will therefore select the suitable foil in accordance with the prescribed upper limits on the basis of his professional knowledge.

Only by way of example polyolefin foils or composite foils based on polyolefins and polyamides may be mentioned here which have a good barrier effect against styrene which is frequently used as solvent in the impregnating resins.

As polyamides the products of the condensation of one or more amino carboxylic acids, such as amino hexanoic acid, amino-7-heptanoic acid, amino-11-undecanoic acid and amino-12-dodecanoic acid and one or more lactams such as caprolactam, oenantholactam, and lauryl lactam and/or one or more salts or mixtures of diamines, such as hexamethylene diamine, dodecamethylelene diamine, m-xylylene diamine, bis(p-aminocyclohexyl) methane and trimethyl hexamethylene diamine with one or more diacids such as isophthalic acid, terephthalic acid, adipic acid, azelaic acid, suberic acid, sebacic acid and dodecanedicarboxylic acid may be mentioned.

Furthermore copolyamides obtained by the condensation of at least two alpha, omega-aminocarboxylic acids or two lactames or one lactam and one alpha, omega-aminocarboxylic acid may be mentioned. Further suitable copolyamides are those obtained as a result of the condensation of at least one alpha, omega-aminocarboxylic acid (or a lactam), at least one diamine and at least one dicarboxylic acid.

As examples for suitable lactams those comprising 3 to 12 carbon atoms in the main ring and which may be optionally substituted are mentioned here. Respective examples are β-dimethyl propiolactam, α,α-dimethyl propiolactram, amylolactam, caprolactam, capryllactam, and lauryllactam. Suitable examples of alpha, omega-aminocarboxylic acids are aminoundecanoic acid and aminododecanoic acid. Examples of suitable dicarboxylic acids are adipic acid, sebacic acid, isophthalic acid, butanedioic acid, 1,4-cyclohexyldicarboxylic acid, terephthalic acid, sodium or lithium salts of sulfoisophthalic acid, dimer fatty acids (having a dimer content of at least 98% and being preferably hydrated) and dodecane dioic acid (HOOC—$(CH_2)_{10}$—COOH). The diamine may be an aliphatic diamine with 6 to 12 atoms or an aryl diamine and/or a saturated cyclic diamine. Examples are hexamethylene diamine, piperazine, tetramethylene diamine, octamethylene diamine, decamethylene diamine, dodeca-imethylene diamine, 1,5-diaminohexane, 2,2,4-trimethyl-1,6-diaminohexane, diaminopolyols, isophorone diamine (IPD), methylpentamethylene diamine (MPDM), bis(aminocyclohexyl)methane (BACM) and bis(3-methyl-4-aminocyclohexyl)methane (BMACM).

Examples for copolyamides are copolymers of caprolactam with lauryllactam (PA-6,12), copolymers of caprolactam, adipic acid and hexamethylene diamine (PA-6/6,6), copolymers of caprolactam, lauryllactam, adipic acid and hexamethylene diamine (PA-6/12/6.6), copolymers of caprolactam, lauryllactam, 11-aminoundecanoic acid, azelaic acid and hexamethylene diamine (PA-6/6,9/11/12), copolymers of caprolactam, lauryllactam, 11-aminoundecanoic acid, adipic acid and hexamethylene diamine (PA-6/6,6/11/12 and copolymers of lauryllactam, azelaic acid and hexamethylene diamine (PA-6,9/12).

Copolymers on the basis of polyolefins and polyamides with a good barrier effect for styrene are e.g. described in EP 1460 109 to which reference is made for further details.

Another group of multilayer foils with a good barrier effect for styrene are copolymers of ethylene and vinyl monomers such as vinyl alcohol (so called EVOH polymers) or vinylacetate (so called EVA copolymers).

Finally, copolymers of olefins and acrylic acid esters may be mentioned here.

Besides the barrier properties as described above in the ling hose after installation a barrier effect against the diffusion or permeation of styrene is in particular advantageous during UV curing. During UV curing high temperatures occur locally and for limited times, at which styrene may form ignitable mixtures with air, which is to be prevented for safety reasons.

The term seamless tubular inner lining hose, as used in the context of the present invention, is intended to denote a tubular foil (hose) which is not obtained from fiber belts by overlaying, gluing, welding or winding. All these manufacturing processes lead to seam areas respectively seam lines at those positions at which the foil ribbons overlap or where margin areas are positioned on top of each other, which overlaps or margin areas are connected with each other and thereby flow resistance is increased or the risk of nucleation is increased.

Seamless foils for use in lining hoses in accordance with the present invention may be obtained by extrusion or injection molding processes with ring-shaped dies. Mono- or co-extrusion (simultaneous extrusion of multiple layers in one foil) of seamless hoses may be mentioned at this point as example. Co-extrusion is particularly suitable for the manufacture of multilayer composite foils which are preferably used in accordance with the present invention as inner tubular foils or hoses. It goes without saying that the skilled person is aware of other manufacturing processes for the manufacture of seamless hoses or tubular foils which are suitable for the manufacture of seamless inner tubular hoses.

Preferred processes for the manufacture of seamless foil hoses are the extrusion blowing and the extrusion blow molding, which are known to the skilled person so that no further details are necessary here.

Since a gluing or welding of longitudinal rims is not necessary if seamless inner tubular foils are used, a reinforcement may be applied over the entire surface so that a homogeneous product of homogeneous thickness and rigidity is obtained which at the same time can connect to the fiber ribbon or the fiber ribbons in a homogeneous manner and over the entire surface. In the products from the prior art such a homogeneous bonding and a bonding over the entire surface may not be obtained at all or only with great difficulties because the necessity of keeping the files in the welding or gluing area free from a reinforcement.

In accordance with a preferred embodiment of the present invention the tubular inner hose comprises functional groups and/or a reinforcement at the surface which in the installed state is oriented towards the resin—impregnated fiber ribbon respectively the resin-impregnated fiber ribbons.

Structure and composition of the inner foil are not subject to particular limitations with regard to the monomer selection. If a resin curable through irradiation is used in the fiber hose, inner foils are preferably used which have a high transparency for the radiation used for curing. Since for curing generally UV-light with wavelengths in the range of from 300 to 500 nm, preferably in the range of from 350 to 450 nm is used, the inner foil should have a low absorption in these wavelength ranges.

The way of incorporating the functional groups is not subject to particular limitation and in principle all processes may be used which are known to the skilled person and which have been described in the literature for respective modifications of foils.

The functional groups are intended to effect a bonding of the inner tubular foil to the resin-impregnated fiber ribbon respectively the resin-impregnated fiber ribbons during the curing of the lining hoses in accordance with the present invention. For this reason the functional groups should be present at the surface for such a time as is necessary for the reaction with the fiber ribbon and preferably with the fiber material or in particular with the curable resin. To the extent the reaction takes only place during curing (which in some cases has been shown to be advantageous), this requires a suitable stability of the functional groups since the lining hoses in accordance with the present invention are generally pre-manufactured and between the production and the curing in the system to be renovated there may be a time period of several weeks or months. The reaction only during curing has the advantage that during installation (introduction) and expansion of the lining hose to snugly fit same to the system to be renovated there are no or only small interactions between the inner tubular foil and the fiber hose, which may have detrimental effects and may for example lead to the formation of wrinkles or similar problems.

Suitable functional groups are e.g. carboxylic acid groups, carboxylic acid anhydride groups, carboxylic acid ester groups, carboxylic acid amide groups, carboxylic acid imide groups, amino groups, hydroxyl groups, epoxide groups, urethane groups and oxazoline groups, to mention only a few preferred examples. Particularly preferred are carboxylic acid groups, carboxylic acid anhydride groups and epoxide groups.

These groups may be obtained by copolymerization of respective monomers with other monomers which form the polymers of which the inner tubular foil is made or through joined use of polymers without functional groups with polymers with functional groups, preferably in the melt or through coextrusion.

To achieve a reaction between the functional groups of the inner foil and the resin it is necessary that the functional groups on the surface of the inner foil which, in the installed state, is oriented towards the resin-impregnated fiber ribbon, are accessible, i.e. have to be present on this surface. Composite foils based on polyolefins and polyamides in which the surface which is oriented towards the fiber ribbon does not comprise functional groups and which have been described in the literature in respective photochemically curable systems as inner foils generally do not fulfill this requirement.

Suitable reactive monomers for the introduction of suitable functional groups are e.g. maleic acid, maleic acid anhydride, itaconic acid, (meth)acrylic acid, and glycidyl (meth)acrylate as well as vinyl esters, in particular vinyl acetate, vinylphosphonic acid, and their esters as well as ethylene oxide and acrylonitrile to mention only a few suitable examples.

The percentage of the comonomers for the introduction of the functional groups is in general in the range of from 0.1 to 50, preferably of from 0.3 to 30 and particularly preferably in the range of from 0.5 to 25 weight percent, based on the entire weight of the monomer mixture These monomers may be co-polymerized in the melt or in solution with the other monomers in accordance with known processes, which have been described in the literature or may be reacted with polymers or monomers without functional groups by e.g. grafting.

During grafting the respective monomers are reacted with a pre-formed polymer backbone. Respective processes are known to the skilled person and have been described in the literature so that no further details need to be given here.

In the following some preferred groups of polymers are described in more detail; the invention is not limited, however, to these groups of polymers.

A first exemplary group of preferred polymers are homopolymers or copolymers of olefins, in particular of α-olefins with preferably 2 to 8 carbon atoms, in particular 2 to 6 carbon atoms. Particular preferred monomers are ethene (ethylene), propene (propylene) and octene, whereby the latter is easily copolymerizable with ethene (ethylene).

As comonomers for the olefins mentioned before in particular alkyl acrylates or alkyl methacrylates derived from alcohols with 1 to 8 carbon atoms, e.g. ethanol, butanol or ethyl hexanol, to mention only some preferred examples, are suitable. Suitable reactive comonomers may be copolymerized with such monomers for the introduction of the functional groups described herein before.

A first preferred group of such polymers with functional groups are copolymers of ethene with ethyl- or butylacrylate and acrylic acid and/or maleic acid anhydride. Respective products are commercially available from BASF SE under the trade names Lupolen® KR1270.

Copolymers of ethene and propene with suitable comonomers for the introduction of the functional groups are also suitable.

Furthermore, ethene/octene copolymers which are grafted with respective monomers for the introduction of functional groups may be mentioned. As example Fusabond® NM493D available from DuPont may be mentioned here.

In some cases so-called functionalized EPDM rubbers have proved to be advantageous, which due to the elastic properties may have advantages by the expansion of the lining hose to snugly fit same to the wall of the system to be renovated. As examples terpolymers of usually at least 30 wt % ethene, at least 30 wt % propene, and up to 15 wt % of a diene component (usually diolefins with at least 5 carbon atoms such as dicyclopentadiene, 1,4-hexadiene or 5-ethylidene norbornene) may be mentioned. Royaltuf® 485 available from Crompton can be mentioned as a commercially available representative.

Suitable polymers furthermore are polymers based on vinyl aromatic monomers and dienes, for example styrene and dienes, wherein the dienes may be fully or partially hydrogenated, and which contain respective functional groups. Such copolymers may be statistical or random copolymers or have a block structure, with mixed forms being possible (so-called tapered structures). Respective products have been described in the literature and are commercially available from various suppliers. As examples the commercial product lines Styrolux® and Styroflex® of BASF SE or styrene/ethene/butene copolymers functionalized with anhydride groups available under the tradename Kraton® G1901FX from Kraton Inc. may be mentioned.

The polymers of the inner foil may contain the functional groups in latent form, i.e. in a form in which the functional group itself is liberated during curing only.

It is furthermore possible to use mixtures of polymers wherein only one of the polymers comprises the functional groups or latent functional groups of the type mentioned above.

Suitable polymers with functional groups in this embodiment are polyamides, polyoxymethylene, acrylonitrile/butadiene/styrene (ABS) copolymers, polymethyl methacrylates, polyvinylacetates and polyvinyl alcohol.

In this embodiment it is important that the polar polymer is easily miscible with the polymer without functional groups. The mixing can advantageously be made in a melt of the polymers. The amount of added polymer with functional groups usually is in the range of from 0.01 to 50 weight percent, based on the weight of the mixture.

Taking into account the aforementioned criteria polyolefins such as polyethylene or polypropylene, polyamides, polyesters such as polybutylene terephthalate, polyethylene terephthalate or polyethylene naphthalate, poly vinyl chloride, polyacrylonitrile or thermoplastic polyurethanes or mixtures of such polymers are principally suitable. Furthermore, thermoplastic elastomers are also principally suitable. Thermoplastic elastomers are materials in which elastic polymer chains are embedded in thermoplastic material. Despite the lack of a vulcanization necessary for classical elastomers, thermoplastic elastomers show elastic properties, which may be advantageous in certain application areas. As examples polyolefin elastomers or polyamide elastomers may be mentioned here. Respective products have been described in the literature and are commercially available from various suppliers so that no further details need to be given here.

Instead of copolymerization or mixing or grafting the functional groups may also be introduced into the inner foil with the assistance of suitable adhesion promoters, which are applied onto the surface of the foils. Suitable adhesion promoters in this embodiment are e.g. silanes, solutions or melts of polar or functionalized polymers and suitable glues and adhesion promoter foils. These are preferably applied in a manner homogeneously covering the foil which forms the inner tubular hose to achieve a homogeneous distribution of the functional groups.

Finally, the functional groups mentioned above may also be obtained by surface treatment of the foils forming the inner tubular hose with reactive gases such as oxygen, fluorine or chlorine. Through the interaction of these media oxygen containing functional groups of the type mentioned as preferred above, such as acid-, acid anhydride or epoxide groups are formed on the surface. It should be mentioned here, however that the distribution of the functional groups at the surface is difficult to control, so that there is a higher probability of an inhomogeneous distribution compared to the product obtained in accordance with the processes described above of co-or graft polymerization or through the use of adhesion promoters. Furthermore type and amount of functional groups may be subject to higher fluctuation in this embodiment.

Instead of the functional groups or in addition to the functional groups the tubular inner foil may comprise a reinforcement or an armoring on the surface oriented towards the resin impregnated fiber ribbon respectively resin impregnated fiber ribbons in the installed state in accordance with a further embodiment. This reinforcement or armoring may replace the functional groups in accordance with the embodiment described herein before entirely or possibly and leads, in the same manner as the embodiment described before with functional groups, to a bonding of the inner tubular foil to the fiber ribbon.

The reinforcement or armoring in accordance with this embodiment may be impregnated with resin, preferably with the same resin which is used for the impregnation of the fiber ribbon or fiber ribbons. The resin impregnation of the armoring can improve the bonding to the resin impregnated fiber ribbons.

Principally any product known to the skilled person in the form of fabrics, knitted fabrics, rovings, mats or non-wovens (fleeces) which may comprise fibers in the form of long endless fibers or short fibers, are suitable. Respective products are known to the skilled person and are commercially available in great variety from different producers and suppliers.

The term fabric (textile) generally denotes sheet-like textile products of at least two orthogonally crossed fiber systems, wherein the so-called warp extends in the longitudinal direction and the so-called weft (shute) extends in a direction orthogonal thereto.

The term knitted fabric generally denotes textile products produced through the formation of meshs.

Fiber rovings or rovings are a processing variant of fibers, in which the fibers are not woven, but oriented parallel to each other embedded in a chemical carrier compound (the matrix) and which are fixed in place usually through cover foils on the upper and the lower surface. Rovings, due to the parallel orientation of the fibers usually show a pronounced anisotropy of stiffness or rigidity in the direction of the orientation and perpendicular thereto, which may be of interest for certain applications.

A non-woven or fleece consists of fibers loosely laid next to each other without being connected. The rigidity of a fleece solely rests on the fiber-inherent attraction, but may be influenced through further processing. In order be able to use and process a non-woven (fleece) same is usually solidified, for which solidification several methods may be used.

Fleeces differ from textiles (fabrics) or knitted fabrics, which are characterized by a particular and defined layering of the single fibers or filaments. Fleeces, in contrast, consist of fibers the orientation of which can only be described with statistical methods. The fibers are randomly oriented in the fleece. The English term non-woven thus clearly differentiates fleeces from textiles. Fleeces are differentiated according to the fiber material (e.g. the polymer in case of chemical fibers), the bonding process, the fiber type (staple or endless fibers), the denier of the fibers and the fiber orientation. The fibers may be oriented in a preferred direction or may be entirely stochastically oriented in the randomly oriented fleece.

If the fibers do not have a preferred direction for their orientation, the term isotropic fleece is used. If the fibers are oriented in one direction more often than in another direction, the term anisotropy is used.

Felts are also suitable as reinforcement for the tubular foil reinforced on both surfaces (sides). A felt is a sheet-like product based on unsorted and difficult to separate fiber material. In principle, felts are thus in principle textiles which are not woven: Felts are usually obtained from chemical fibers or natural plant-based fibers through dry needling (so called needled felts) or through solidification with water beams which exit from a beam with dies (die beam) under high pressure. The individual fibers in a felt are interlooped with each other in a random manner.

Needled felts are usually mechanically manufactured with a multiplicity of needles with flukes (barbs), wherein the barbs or flukes are positioned in reverse direction compared to a harpoon. Thereby, the fibers are pressed into the felt and the needle can be easily pulled out. Through repeated stitching the fibers are looped (entangled) with each other and thereafter optionally treated chemically or with water vapor.

Felts—as fleeces—may be manufactured from basically all natural or synthetic fibers. Besides needling or in addition to needling the fibers it is also possible to hook the fibers with a pulsed water beam or a binding agent. The latter methods are in particular suitable for fibers without scale structure such as polyester or polyamide fibers.

Felts show a good temperature stability and are usually hydrophobic, which may be an advantage for the application in fluid-carrying systems.

The length of the fibers used in fiber-containing reinforcing elements is not subject to a particular limitation, i.e. so-called long fibers as well as short fibers or fiber fragments may be used. The length of the fibers may be used to adjust and control the properties of the respective fiber belts (ribbons) over a wide range.

The type of fibers used is not subject to particular limitations either. Only by way of example glass fibers, carbon fibers or polymer fibers such as aramide fibers or fibers based on thermoplastic polymers such as polyesters or polyamides or polyolefins (e.g. polypropylene) shall be mentioned here, which are known to the person skilled in the art with their properties and which are commercially available in great variety. For economic reasons, glass fibers are usually preferred; if e.g. a particular heat resistance is of importance, however, aramide fibers or carbon fibers may be used, which may offer advantages compared to fibers based on thermoplastic polymers as far as rigidity or stiffness at higher temperatures is concerned.

The bonding of the reinforcement on both sides (surfaces) with the foil (film) may be effected in a manner know per se, e.g. thermally through welding or laminating or with the use of suitable glues. It is important to have a bonding which is sufficiently stable to avoid a separation or delamination during the manufacture of the lining hose.

By co-extrusion or pultrusion reinforced and multilayer composite foils in tubular form which comprise a reinforcement or armoring of the time required in accordance with the present invention may be obtained.

The impregnation of the resin impregnated fiber ribbon or the resin impregnated fiber ribbons, which are in contact with the tubular inner foil with resin is effected in a manner known per se. Respective processes are known to the skilled person and described in the literature so that there is no need to provide further details here.

The skilled person will select the resin used for impregnation depending on the type of its fiber reinforcement and depending on the necessary properties in the individual application case. Resins for the impregnation of fiber systems have been described in the literature in great variety and are known to the skilled person.

Resins which may be cured photochemically have proved to be advantageous in a number of application cases.

In accordance with an embodiment of the present invention the at least one curable resin may be an unsaturated polyester resin, a vinyl ester resin or an epoxide resin, wherein the at least one curable resin is photochemically curable and comprises a photo initiator.

Through the use of a photochemically curable resin comprising a photo initiator curing of the resin with electromagnetic radiation, in particular with UV-radiation is possible. Thereby a particularly quick and efficient curing with minimized energy use is possible after the introduction of the lining hose in a pipe system to be renovated. Suitable reactive resins for curing with UV-radiation with footwear initiators are described e.g. in EP A 23634. Since radiation with a wavelength in the range of from 300 to 500 nm, preferably in the range of from 350 to 450 nm, is used for curing the inner tubular foil should have an absorption or extinction at these wavelength ranges as low as possible.

The extinction respectively the absorption of foils is generally characterized through the transparency, i.e. the capability of the foil tested to let through electromagnetic waves of the respective wavelengths (transmission). Incoming photons depending on their energy interact with different components of the material so that the transparency of a material depends on the frequency of the magnetic wave.

Besides the efficient curing by UV radiation use of UV radiation is also advantageous to kill germs potentially present and to sterilize the lining hose.

In accordance with an embodiment of the present invention it has been found advantageous if the epoxide resin is an epoxide resin curable by photochemically initiated cationic polymerization.

Besides photochemically curable resins thermally curable resins which are cured by an increase in temperature (e.g. vapor curing or the like) may be used. When using such resins a good temperature management prior to the installation of the lining hoses is necessary to avoid a premature curing. The lining hose prior to curing has to be stored and processed at temperatures which are below the temperature used for curing. This may, depending on the exterior conditions and depending on the time of the year, necessitate a cooling of the lining hoses between manufacture and installation.

In accordance with a preferred embodiment the lining hose may, in addition, comprise at least one outer foil, which is positioned on the surface of the resin impregnated fiber ribbons opposite to the surface facing the inner foil.

For such an outer foil in principle the same polymers may be used as have been described above for the inner foil. The outer foil may comprise functional groups or a reinforcement or armoring to improve the bonding to the resin impregnated fiber ribbon respectively the resin impregnated fiber ribbons on the surface of the outer foil facing the resin impregnated fiber ribbon respectively fiber ribbons. With regard to functional groups or the reinforcement or armoring the description above for the seamless inner tubular hose applies in the same manner.

Since the outer tubular hose is not in contact with the fluid medium transported in the pipe system, the same may comprise a seam. This allows the manufacture of the outer tubular foil through winding or coiling or bringing together the longitudinal rims of a flat foil, which facilitates the technical manufacture and introduction into the lining hose in accordance with the present invention. It is, however, also possible, to use a seamless tubular foil also for the outer tubular hose, which may e.g. be drawn over the lining hose composed of inner foil and resin impregnated fiber ribbons.

Generally preferred, however, is the use of wound or coiled outer tubular foils (foil hoses) which are obtained through gluing or welding of flat foils.

In accordance with a further embodiment of the invention a further tubular foil may be comprised in the lining hose between the inner tubular foil described above and the fiber ribbon respectively the fiber ribbons, which additional tubular foil comprises an armoring on both sides. In accordance with this embodiment the seamless inner tubular foil is no longer in direct contact with the fiber ribbon respectively the fiber ribbons but the contact is achieved indirectly. By virtue of the armoring on both sides a bonding of the second inner tubular foil to the resin impregnated fiber ribbon respectively the resin impregnated fiber ribbons on one hand as well as to the inner tubular foil described above is achieved (this leads to the indirect contact in the sense of the present invention).

The polymer material for the foils of this tubular foil optionally present and armored on both sides is not subject to particular limitations and the skilled person will select a suitable foil material depending on the intended application case. It is advantageous if the tubular foil has a barrier effect for resins or resin components (e.g. solvents) present in the resin impregnated fiber ribbons, which are in contact with the foil armored on both sides. Suitable foil materials are known to the skilled person and have been described in the literature. By way of example polyolefin foils or composite foils based on polyolefins and polyamides may be mentioned here, which have a good barrier effect for styrene which is often present as solvent in the resins used for impregnation.

Particularly preferred the armoring of the foil armored on both sides is a lamination with a fleece.

In the following the term fleece shall also include arrangements of more than one fleece, i.e. each of the fleece layers may consist of a combination of several fleeces. One fleece per fleece layer is preferred, however.

The foil armored on both surfaces or the armoring itself may be but does not mandatorily need to be impregnated with resin.

It is principally advantageous that the elements of the lining hose positioned on the inner side of the lining hose are selected such that same have a high transparency for the radiation used for curing if the curing is done by radiation.

In accordance with a further embodiment of the present invention at least one further out to tubular foil may be positioned on top of the first outer tubular foil as described above. The additional outer tubular foil or the additional outer tubular foils maybe armored on one side or on both sides, in particular with a fleece layer. In such case the first tubular foil would not be designated as outer tubular foil, but as tubular foil positioned on the outer side, wherein positioned on the outer side means that the tubular foil is positioned on the side of the fiber ribbons opposite to the side of the fiber ribbons oriented towards a fluid medium transported in the pipe.

Additional tubular foils may be advantageous for further improving the tightness, in particular for the tightness in the peripheral areas of the lining hoses in accordance with the present invention.

If further, optionally armored, additional tubular foils are used, usually at least one of the armorings of two tubular foils being in contact is impregnated with. Resin. Impregnation of one armoring in case of two armorings being in contact is normally sufficient to achieve an impregnation respectively soaking of the second armoring also, which is advantageous for the bonding of the armorings and also for the leak tightness after curing.

In a correct notation only the tubular foil which forms the outer periphery of the lining hose, which separates the lining hose from the environment (in the case of sewer lines usually the soil) should be named outer tubular foil.

The thickness of the various armoring layers, preferably fleece layers, is not subject to particular limitations. In some cases thicknesses in the range of from 10 µm to 1000 µm, preferably of from 20 to 500 µm and in particular of from 25 to 150 µm and/or an area weight of from 10 to 300 g/m², preferably of from 15 to 200 g/m² and in particular in the range of from 20 to 80 g/m² have been found to be advantageous. In some cases thicknesses in the range of from 40 to 90 µm have been found advantageous.

On top of the foils positioned on the outside of the lining hoses in accordance with the present invention usually at least one light-impermeable protective layer is positioned, which may also comprise a layer formed as diffusion barrier and which protects the lining hose during transport from damages and prevents a premature curing (in particular when photochemically curable resins are used). This layer or foil remains in the pipe system after introduction of the lining hose into the pipe system to be renovated if the lining hose is introduced by pulling-in without inversion into the pipe system to be renovated. If the lining hose is introduced by inversion into the pipe system to be renovated this protective foil in the installed state becomes an inner foil and is removed after introduction into the pipe system and prior to curing since a curing by irradiation would not be possible due to the impermeability of this tubular hose for the light used for curing.

In accordance with a preferred embodiment the lining hose may comprise one or more inner protective layers, in particular in the form of polymer layers on the side of the curable layer of one or more fiber ribbons oriented towards the fluid medium. Respective foils are known per se to the skilled person and have been described in the literature so that further details are not necessary here.

Lining hoses in accordance with the present invention comprising a seamless inner tubular foil after introduction into the fluid carrying pipe system and subsequent curing show a particularly good leak tightness, which is in particular advantageous in application cases where the pipe systems to be renovated are located in areas which are protected or have to be protected.

Due to the lack of seam areas of the inner tubular hose in accordance with the present invention no points of attack for the forming of deposits are available, which could promote nucleation. Since furthermore no connecting areas are present in the seamless hose no leak tightness problem can occur at this point.

Finally it is advantageous that, due to the missing seam points of the inner tubular foil, a reduced flow resistance is achieved. This is advantageous in the case of renovation of pipe systems which have no dead volume and in which an increased flow resistance has to be overcome by use of additional energy.

Furthermore it is advantageous that the inner tubular foil after installation of the lining hose in the fluid carrying pipe system does not have to be pulled out mandatorily but may remain in that pipe system (which is preferred in accordance with the present invention), since the inner tubular hose is sufficiently bonded to the curable layer to avoid problems during the later operation.

the present invention therefore also relates to queue would lining hoses with inner tubular foils which are bonded to the curable layer or are connected with same.

Furthermore, the invention relates to the use of a lining hose in accordance with the present invention for the renovation of fluid carrying pipe systems, in particular pipe systems for water or wastewater or for the renovation of pipe systems in industrial production plants.

The invention claimed is:

1. A lining hose for the renovation of pressurized pipe systems for the transport of fluid media with:
   at least one seamless inner tubular foil, at least one curable layer comprising at least one fiber ribbon or ribbons impregnated with a curable resin, said curable layer is positioned directly or indirectly on the at least one seamless inner tubular foil, wherein the seamless inner tubular foil is a multilayer composite foil, and
   wherein the lining hose further comprises at least one outer foil which is arranged on the surface of the at least one fiber ribbon or ribbons oriented opposite to the inner foil, and
   wherein the seamless inner tubular foil comprises and is bonded to a reinforcement or armoring on the surface which is different from the curable layer comprising at least one fiber ribbon or ribbons impregnated with a curable resin, and which, in the installed state, is oriented towards the at least one fiber ribbon or ribbons, wherein bonding of the reinforcement or armoring is obtained through welding, laminating, or using suitable glues and is sufficiently stable to avoid a separation or delamination during the manufacture of the lining hose.

2. The lining hose of claim 1 wherein the pressurized pipe system are pressurized pipes for water or wastewater or pressurized pipes in industrial production facilities.

3. The lining hose of claim 1 characterized in that the multilayer composite foil comprises a barrier layer.

4. The lining hose of claim 1 characterized in that the multilayer composite foil is based on olefin homo- or copolymers and/or polyamides and/or that the inner foil has a thickness of from 100 to 1000 µm.

5. The lining hose of claim 1 characterized in that the curable resin is an unsaturated polyester resin, a vinyl ester resin or an epoxide resin and wherein the curable resin is photochemically curable and comprises a photo initiator.

6. The lining hose of claim 5 characterized in that the curable resin is an epoxide resin curable by photochemically initiated cationic polymerization.

7. The lining hose of claim 1 characterized in that the at least one outer foil comprises at least on the surface oriented towards the resin impregnated fiber ribbon or ribbons a reinforcement and/or an armoring in the form of fleeces, felts, fabrics and/or rovings, in particular a lamination with a fleece.

8. The lining hose of claim 1 characterized in that the seamless inner tubular foil comprises an antibacterial finish.

9. The lining hose of claim 1 characterized in that the multilayer composite foil is based on olefin homo- or copolymers and/or polyamides and/or that the inner foil has a thickness of from 100 to 500 µm.

10. The lining hose in accordance with claim 1 comprising a further outer tubular foil positioned on top of the first outer tubular foil.

11. The lining hose in accordance with claim 10 wherein the further outer tubular foil is armored on one side or on both sides.

12. The lining hose in accordance with claim 11 wherein the armoring is a fleece.

13. A renovated pressurized pipe system comprising the lining hose of claim 1.

* * * * *